US011838186B2

(12) United States Patent
Koshiji et al.

(10) Patent No.: US 11,838,186 B2
(45) Date of Patent: Dec. 5, 2023

(54) TOPOLOGY DESIGN APPARATUS, TOPOLOGY DESIGN METHOD AND PROGRAM

(71) Applicant: NIPPON TELEGRAPH AND TELEPHONE CORPORATION, Tokyo (JP)

(72) Inventors: Kojun Koshiji, Musashino (JP); Yasuharu Kaneko, Musashino (JP); Mika Ishizuka, Musashino (JP); Saburo Seto, Musashino (JP); Seisho Yasukawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/757,614

(22) PCT Filed: Dec. 20, 2019

(86) PCT No.: PCT/JP2019/050195
§ 371 (c)(1),
(2) Date: Jun. 17, 2022

(87) PCT Pub. No.: WO2021/124574
PCT Pub. Date: Jun. 24, 2021

(65) Prior Publication Data
US 2023/0017693 A1    Jan. 19, 2023

(51) Int. Cl.
*H04L 41/14*    (2022.01)
*H04L 45/00*    (2022.01)

(52) U.S. Cl.
CPC .......... *H04L 41/145* (2013.01); *H04L 45/563* (2013.01)

(58) Field of Classification Search
CPC ....... H04L 69/22; H04L 45/00; H04L 45/745; H04L 45/74591; H04L 45/7452;
(Continued)

(56) References Cited

U.S. PATENT DOCUMENTS

| 2005/0154790 A1* | 7/2005 | Nagata ................... H04L 45/30 709/223 |
| 2012/0051261 A1* | 3/2012 | Chandrasekaran ... H04M 7/128 370/254 |
| 2015/0249587 A1* | 9/2015 | Kozat .................... H04L 43/20 370/236 |

OTHER PUBLICATIONS

Tomoya Kitani et al., "A Proposal of Hierarchical Chordal Ring Network Topology for WDM Networks", Information Processing Society of Japan Journal, vol. 46, No. 9, 2005, pp. 2176-2184.

* cited by examiner

*Primary Examiner* — Djenane M Bayard
(74) *Attorney, Agent, or Firm* — IPUSA, PLLC

(57) ABSTRACT

A topology design device for an optical transmission network includes a memory; and a processor to determine a bypass target area as an area to which a bypass route is to be added in the network, the area indicating a region surrounded by nodes and edges, based on an area demand, namely a total value of a demand for communication to be performed via an edge, by referencing a topology management database storing information regarding nodes, edges, and areas in the network, and a demand management database storing demands in the network; and exclude a node from nodes constituting the bypass target area and determining a bypass route from the nodes from which the node has been excluded, based on a node demand, namely a total value of a demand for which each node serves as a start or end point of the demand, by referencing the databases.

7 Claims, 9 Drawing Sheets

(58) Field of Classification Search
CPC . H04L 47/10; H04L 49/3009; H04L 49/3072; H04L 69/16; H04L 45/60; H04L 47/125; H04L 47/20; H04L 49/205; H04L 49/3036; H04L 63/0227; H04L 47/11; H04L 45/54; H04L 63/1458; H04L 9/40; H04L 12/5601; H04L 45/74; H04L 49/25; H04L 49/309; H04L 2012/5652; H04L 43/0847; H04L 43/18; H04L 65/1066; H04L 2012/5679; H04L 2012/5681; H04L 45/122; H04L 45/48; H04L 45/72; H04L 47/6225; H04L 49/103; H04L 49/108; H04L 49/1538; H04L 49/203; H04L 49/252; H04L 49/3081; H04L 49/608; H04L 49/90; H04L 49/901; H04L 49/9042; H04L 49/9047; H04L 49/9057; H04L 45/742; H04L 41/12; H04L 63/0428; H04L 45/02; H04L 45/04; H04L 45/12; H04L 45/34; H04L 61/106; H04L 45/22; H04L 45/28; H04L 45/50; H04L 47/12; H04L 43/10; H04L 43/0864; H04L 43/50; H04L 45/42; H04L 41/0668; H04L 49/109; H04L 2101/622; H04L 47/22; H04L 69/324; H04L 41/145; H04L 43/08; H04L 45/026; H04L 47/70; H04L 49/505; H04L 12/437; H04L 12/4641; H04L 41/0806; H04L 41/085; H04L 41/0896; H04L 41/20; H04L 45/123; H04L 45/645; H04L 45/70; H04L 61/2567; H04L 12/28; H04L 12/4675; H04L 2012/5621; H04L 2012/5627; H04L 41/0654; H04L 45/03; H04L 45/16; H04L 45/20; H04L 45/30; H04L 45/507; H04L 45/563; H04L 45/66; H04L 47/122; H04L 49/102; H04L 12/2898; H04L 12/413; H04L 12/42; H04L 12/4604; H04L 12/462; H04L 12/6418; H04L 12/66; H04L 41/24; H04L 43/0811

See application file for complete search history.

Fig. 9

| ITEM NO. | START POINT | END POINT | TRANSIT |
|---|---|---|---|
| 1 | N8 | N4 | N8, N7, N4 |
| 2 | N7 | N6 | N7, N8, N6 |
| 3 | N8 | N7 | N8, N7 |
| 4 | N2 | N1 | N2, N1 |
| 5 | N1 | N6 | N1, N2, N5, N6 |
| 6 | N1 | N6 | N1, N2, N5, N6 |
| 7 | N1 | N8 | N1, N2, N5, N8 |
| 8 | N8 | N5 | N8, N5 |
| 9 | N7 | N2 | N7, N4, N5, N2 |
| 10 | N5 | N6 | N5, N6 |

TOPOLOGY DESIGN APPARATUS, TOPOLOGY DESIGN METHOD AND PROGRAM

TECHNICAL FIELD

The present invention relates to topology design in optical transmission networks.

BACKGROUND ART

The importance of optical transmission networks is increasing, and there is a need for topology design for efficiently accommodating communication demands (hereinafter referred to as demands). To address this, a topology design method called hierarchical chordal ring network has been proposed (NPL 1).

In the conventional technique described in NPL 1, the number of areas where the number of nodes belonging thereto is the largest is set to five, and a ring network is divided such that the number of nodes belonging to each of the areas created when the network is divided is about the same. Note that each area is called a cluster in NPL 1.

The division is continued, and when an area is generated where the number of nodes is nine or less, this area is regarded as the smallest area, and the division is terminated. An edge is added in the smallest area in accordance with a predetermined rule. The number of hops is suppressed and the number of required wavelengths is reduced by designing a topology using such a design method.

CITATION LIST

Non Patent Literature

[NPL 1] Kitani, Funabiki, and Higashino, "A Proposal of Hierarchical Chordal Ring Network Topology for WDM Networks", Information Processing Society of Japan Journal, Vol. 46, No. 9, September 2005.

SUMMARY OF THE INVENTION

Technical Problem

When a situation arises where a demand cannot be accommodated while operating an optical transmission network, equipment (nodes and edges) of the optical transmission network is added, but in many cases, adjacent nodes to form a pair are also added, and there are few cases where an individual node is added. For this reason, in an actual optical transmission network, it is important to design a topology such that demands are evenly accommodated.

However, the conventional technique disclosed in NPL 1 is based on the premise that there are many demands for which the pair of nodes is complete within an area (property called small world). For this reason, in the topology in the conventional technique disclosed in NPL 1, when there are many demands for connections between areas, the demands are concentrated on edges of a top area with many nodes, and demand accommodation becomes uneven.

Accordingly, there is a desire for topology design for leveling demand accommodation while taking into account constraint conditions that need to be considered when constructing an actual optical transmission network.

The present invention has been made in view of the above points, and an object of the present invention is to provide a technique for designing a topology of an optical transmission network that can accommodate demand in a distributed manner.

Means for Solving the Problem

According to the disclosed technique, a topology design device for designing a topology in an optical transmission network is provided, the device including:

a bypass target area determination unit for determining a bypass target area, which is an area to which a bypass route is to be added in the optical transmission network, the area indicating a region surrounded by nodes and edges, based on an area demand, namely a total value of a demand for communication to be performed via an edge, by referencing a topology management database that stores information regarding nodes, edges, and areas in the optical transmission network, and a demand management database that stores demands in the optical transmission network; and a bypass determination unit for excluding a node from a plurality of nodes constituting the bypass target area and determining a bypass route from the plurality of nodes from which the node has been excluded, based on a node demand, namely a total value of a demand for which each node serves as a start point or an end point of the demand, by referencing the topology management database and the demand management database.

Effects of the Invention

According to the disclosed technique, it is possible to design a topology of an optical transmission network that can accommodate demand in a distributed manner.

BRIEF DESCRIPTION OF DRAWINGS

FIG. 9 is a diagram showing an example configuration of a demand management DB.

DESCRIPTION OF EMBODIMENTS

Hereinafter, an embodiment of the present invention will be described with reference to the drawings. The embodiment described below is merely an example, and embodiments to which the present invention is applied are not limited to the following embodiment.

The present embodiment will describe a technique for realizing improvement of demand accommodation efficiency by adding a bypass route to an existing topology such that demands are accommodated in a distributed manner, based on the trend of demand generation in an optical transmission network.

Note that adding a bypass route means that a "node 1→node 3" route is added when there is a "node 1→node 2→node 3→node 4" route, for example. In this example, the "node 1→node 3" bypass route allows part of or the entire traffic that has passed through the "node 1→node 2→node 3" route to bypass this route and pass through the "node 1→node 3" bypass route.

In the following, adding a bypass route may also be expressed as "bypassing". Also, a bypass route may also be expressed as a "bypass".

(System Overall Configuration)

Figure 1:
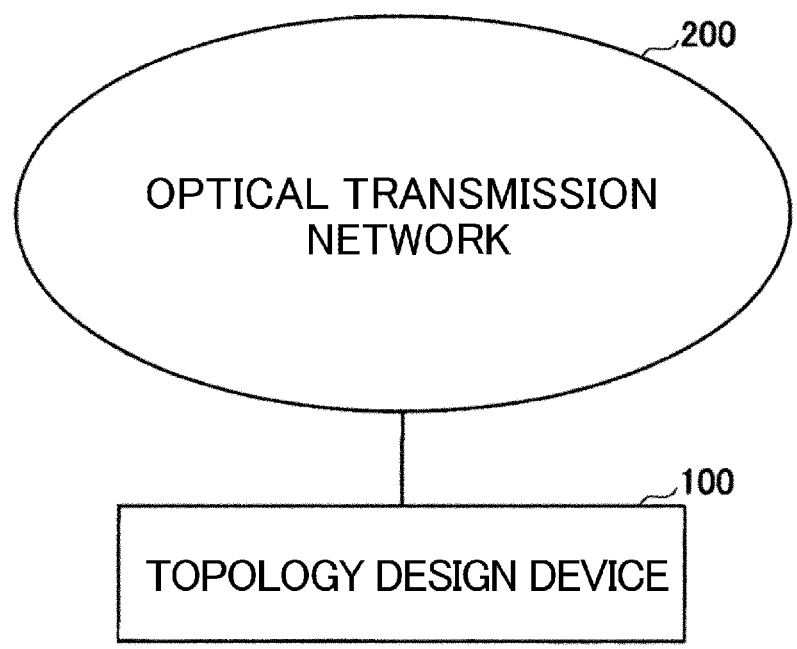
FIG. 1 is an overall configuration diagram of a system according to an embodiment of the present invention.

FIG. 1 is an overall configuration diagram of a system in the present embodiment. As shown in FIG. 1, this system has a topology design device 100 and an optical transmission network 200.

The optical transmission network 200 is a backbone network such as an IP communication network for realizing communication using optical signals. The optical transmission network 200 includes a plurality of nodes (optical transmission devices etc.) and edges (transmission paths for transmitting optical signals etc.) that connects the nodes. In the present embodiment, a configuration including nodes and edges is called a "topology".

In the present embodiment, a plurality of areas that constitute the optical transmission network 200 are defined while assuming that the entire optical transmission network 200 is configured by combining small areas.

The topology design device 100 is a device for designing the topology of the optical transmission network 200. The details of the topology design device 100 will be described later.

(Device Configuration)

Figure 2:
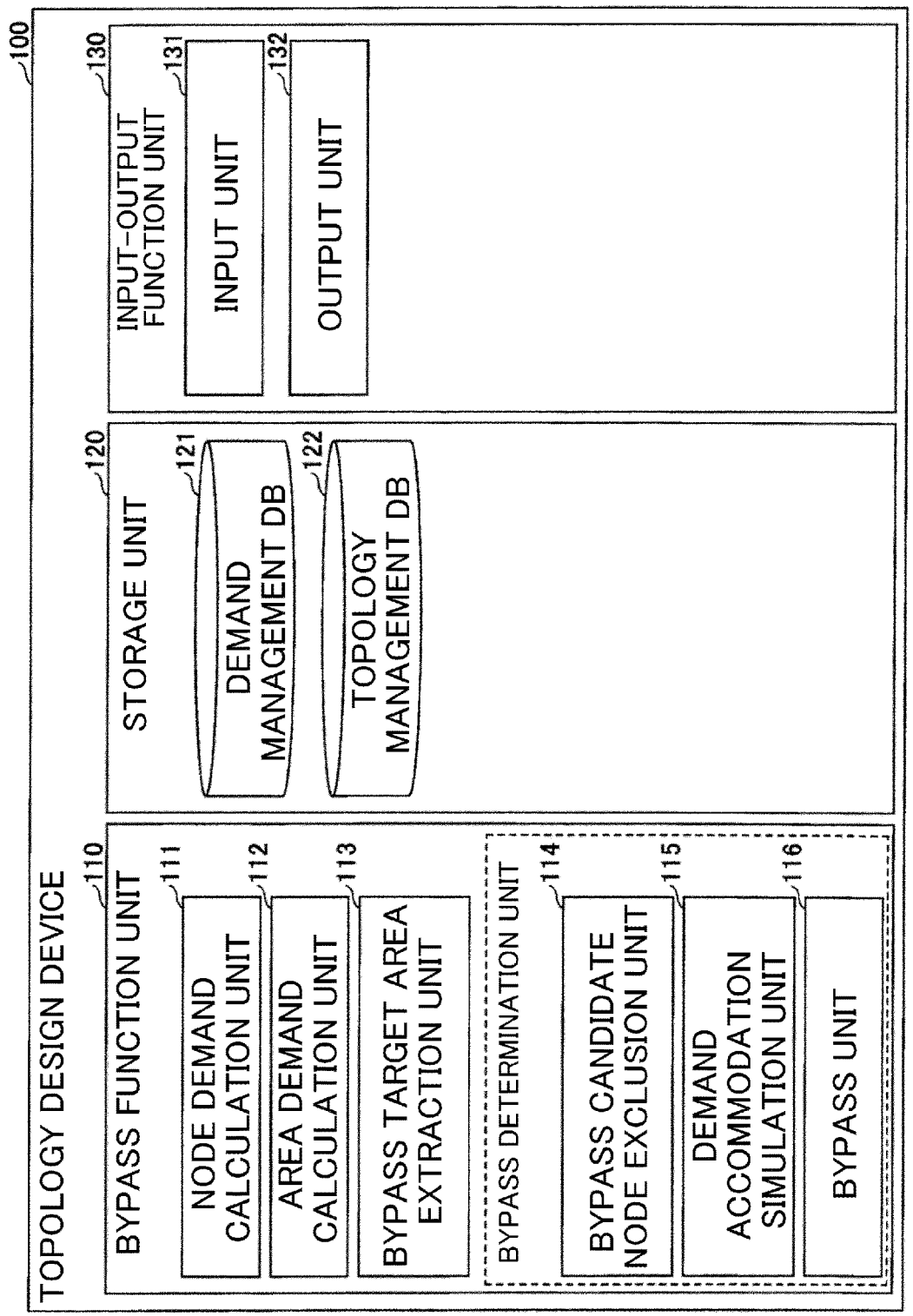
FIG. 2 is a configuration diagram of a topology design device.

FIG. 2 is a functional configuration diagram of the topology design device 100. As shown in FIG. 2, the topology design device 100 has a bypass function unit 110, a storage unit 120, and an input-output function unit 130.

Note that the configuration shown in FIG. 2 is an example. Any functional configuration may be employed as long as topology design described in the present embodiment can be performed. The topology design device 100 may be one device or may be constituted by a plurality of devices. The topology design device 100 may be connected to the optical transmission network 200 as shown in FIG. 1, but does not need to be connected to the optical transmission network 200. In the following, each part of the topology design device 100 will be described.

As shown in FIG. 2, the bypass function unit 110 has a node demand calculation unit 111, an area demand calculation unit 112, a bypass target area extraction unit 113, a bypass candidate node exclusion unit 114, a demand accommodation simulation unit 115, and a bypass unit 116.

The node demand calculation unit 111 calculates the total value of demands for which each node constituting the optical transmission network serves as a start point or an end point of the demands, based on information in a later-described demand management DB 121. These demands are called node demands.

The area demand calculation unit 112 calculates the total value of demands for communication to be performed via one or more edges in each area, based on information in a later-described topology management DB 122 and the demand management DB 121. These demands are called area demands.

The bypass target area extraction unit 113 determines which area is to be a bypass target, based on the output results from the area demand calculation unit 112. The bypass target area extraction unit 113 may also be called a bypass target area determination unit.

The bypass candidate node exclusion unit 114 determines a node to be excluded from bypass candidates in the area extracted by the bypass target area extraction unit 113, based on information in the later-described demand management DB 121.

The demand accommodation simulation unit 115 extracts all bypass candidates with respect to the nodes other than the node excluded by the bypass candidate node exclusion unit 114. The demand accommodation simulation unit 115 then simulates demand accommodation in each bypass candidate, based on information in the later-described demand management DB 121. The bypass unit 116 determines a bypass location and adds a bypass route to the topology, based on the output results from the demand accommodation simulation unit 115.

Note that a configuration having the bypass candidate node exclusion unit 114, the demand accommodation simulation unit 115, and the bypass unit 116 may also be called a bypass determination unit, as shown in FIG. 2.

As shown in FIG. 2, the storage unit 120 has the demand management DB 121 and the topology management DB 122. The demand management DB 121 stores information regarding demands in the optical transmission network 200. The topology management DB 122 stores information regarding the topology of the optical transmission network 200. A "demand" refers to traffic from a start node to an end node.

Note that either or both the demand management DB 121 and the topology management DB 122 may be provided outside the topology design device 100. If these DBs are provided outside, functional units that reference these DBs in the topology design device 100 access the DBs via a network.

The input-output function unit 130 has an input unit 131 and an output unit 132. The input unit 131 inputs the definition of each area and inputs whether or not to add a bypass route. The output unit 132 outputs, for example, the execution results from the aforementioned functional units.

(Example Hardware Configuration)

The topology design device 100 can be realized by executing a program that describes the processing content described in the present embodiment. Note that this "computer" may be a physical machine or a virtual machine. When a virtual machine is used, "hardware" described here is virtual hardware.

The topology design device 100 can be realized by executing a program corresponding to processing carried out in the topology design device 100 using hardware resources, such as a CPU and memories, contained in the computer. The aforementioned program can be recorded in a computer-readable recording medium (portable memory etc.) and stored and distributed. The program can also be provided through a network such as the Internet or by means of an e-mail.

Figure 3:
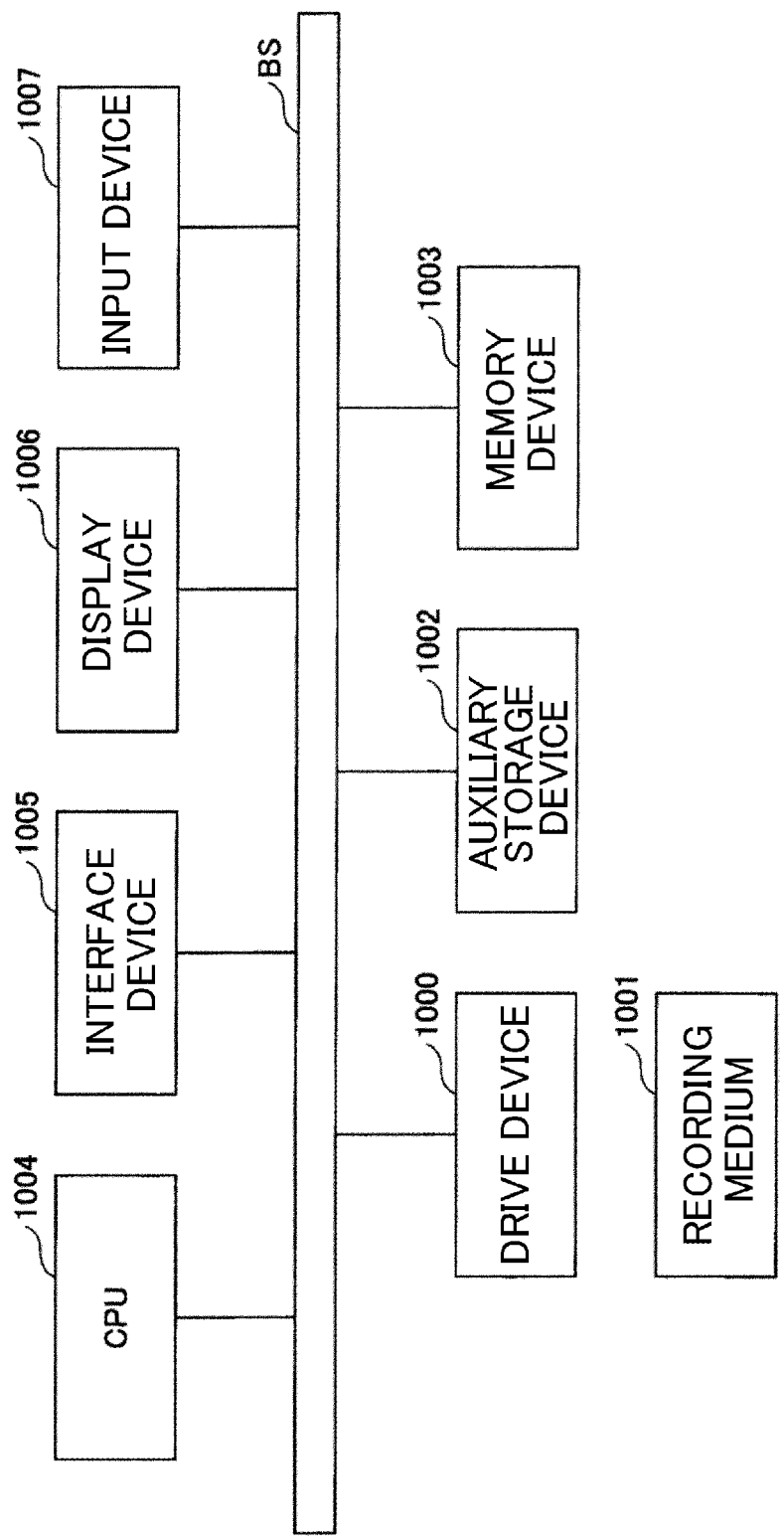
FIG. 3 is a diagram showing an example of a hardware configuration.

FIG. 3 is a diagram showing an example hardware configuration of the computer. The computer in FIG. 3 has a drive device 1000, an auxiliary storage device 1002, a memory device 1003, a CPU 1004, an interface device 1005, a display device 1006, an input device 1007, and so on, which are connected to each other by a bus B.

The program that realizes processing performed by this computer is provided by, for example, a recording medium 1001, such as a CD-ROM or a memory card. When the recording medium 1001 that stores the program is set into the drive device 1000, the program is installed on the auxiliary storage device 1002 from the recording medium 1001 via the drive device 1000. However, the program does not necessarily need to be installed from the recording medium 1001, and may alternatively be downloaded from other computers via a network. The auxiliary storage device 1002 stores the installed program, and also stores necessary files, data, or the like.

The memory device 1003 reads out and stores the program from the auxiliary storage device 1002 if an instruction to start the program is given. The CPU 1004 realizes functions related to the topology design device 100 in accordance with the program stored in the memory device 1003. The interface device 1005 is used as an interface for connecting to the network. The display device 1006 displays a GUI (Graphical User Interface) or the like based on the program. The input device 1007 includes a keyboard, a mouse, buttons, a touch panel, or the like, and is used to input various operation instructions.

(Operation of Topology Design Device 100)

Next, the operation of the topology design device 100 will be described with reference to the flowcharts. Note that an overview will be described here, and an example of detailed operation using a specific example of the topology and areas will be described later in an example.

<Overall Operation>

The overall operation of the topology design device 100 will be described with reference to the flowchart in FIG. 4.

In S101, the number of bypasses is input to the topology design device 100 through the input unit 131. Note that the number of bypasses is used as a condition for ending the processing. A flow may alternatively be employed that is carried out without the number of bypasses input in advance; e.g., bypassing may be repeated until a bypass candidate cannot be determined any more.

In S102, the node demand calculation unit 111 calculates node demands. In S103, the area demand calculation unit 112 calculates area demands. In S104, the bypass target area extraction unit 113 extracts a bypass target area.

In S105, the bypass candidate node exclusion unit 114 excludes a bypass candidate node. In S106, the demand accommodation simulation function unit 115 simulates demand accommodation. In S107, the bypass unit 116 repeats bypassing until the end condition, such as that a designated number of bypasses is completed, is satisfied.

<Processing for Extracting Bypass Target Area>

The content of the processing for extracting a bypass target area in S104 will be described with reference to FIG. 5. In S1041, the bypass target area extraction unit 113 calculates a threshold (hereinafter, area extraction threshold) for extracting an area with many area demands. In S1042, the bypass target area extraction unit 113 extracts areas with area demands that exceed the area extraction threshold out of a plurality of areas present in the optical transmission network 200.

In S1043, whether or not the number of areas extracted is one is determined. If the number of areas extracted is more than one, the processing proceeds to S1044. If the number of areas extracted is one, this area is determined as a bypass target area.

In S1044, the bypass target area extraction unit 113 calculates the number of nodes that constitute each of all the extracted areas. In S1045, the bypass target area extraction unit 113 determines an area with the largest number of nodes as the bypass target area. Note that if there are a plurality of areas with the largest number of nodes, one of these areas that has the largest number of area demands is determined as the bypass target area.

<Processing for Excluding Bypass Candidate Node>

The content of the processing for excluding the bypass candidate node in S105 will be described with reference to FIG. 6. In S1051, the bypass candidate node exclusion unit 114 calculates a threshold (hereinafter, node exclusion threshold) for excluding a node with many node demands. In S1052, the bypass candidate node exclusion unit 114 excludes a node with node demands that exceed the node exclusion threshold from the bypass candidate area.

<Demand Accommodation Simulation Processing>

The content of the demand accommodation simulation processing in S106 will be described with reference to the flowchart in FIG. 7.

In S1061, the demand accommodation simulation unit 115 extracts, in the bypass candidate area, all bypass candidates (candidates for bypass routes) with respect to the nodes other than the node excluded in the aforementioned S105.

In S1062, it is determined whether or not the number of bypass routes that are bypass candidates is one. If the number is one, this bypass route is added (S107). If the number of bypass routes is more than one, the processing proceeds to S1063.

In S1063, the demand accommodation simulation unit 115 simulates demand accommodation for each bypass candidate (the topology of the optical transmission network 200 to which the bypass route is added), and determines the bypass route based on the simulation results.

Although the simulation method is not limited to a specific method, for example, the simulation is carried out by searching for a route (determining a transit node) for each demand stored in the demand management DB 121 in accordance with a specified rule, allocating wavelengths, and accommodating the demand. Any evaluation index with which accommodation efficiency can be evaluated, such as the maximum wavelength number used, or the total value or the average value of the number of paths to the nodes that constitute the network, may be used to compare the simulation results.

For example, when a bypass route 1 and a bypass route 2 are compared, the bypass route 1 is selected if the accommodation efficiency in the simulation result for the bypass route 1 is better than the accommodation efficiency in the simulation result for the bypass route 2.

EXAMPLE

Figure 8:
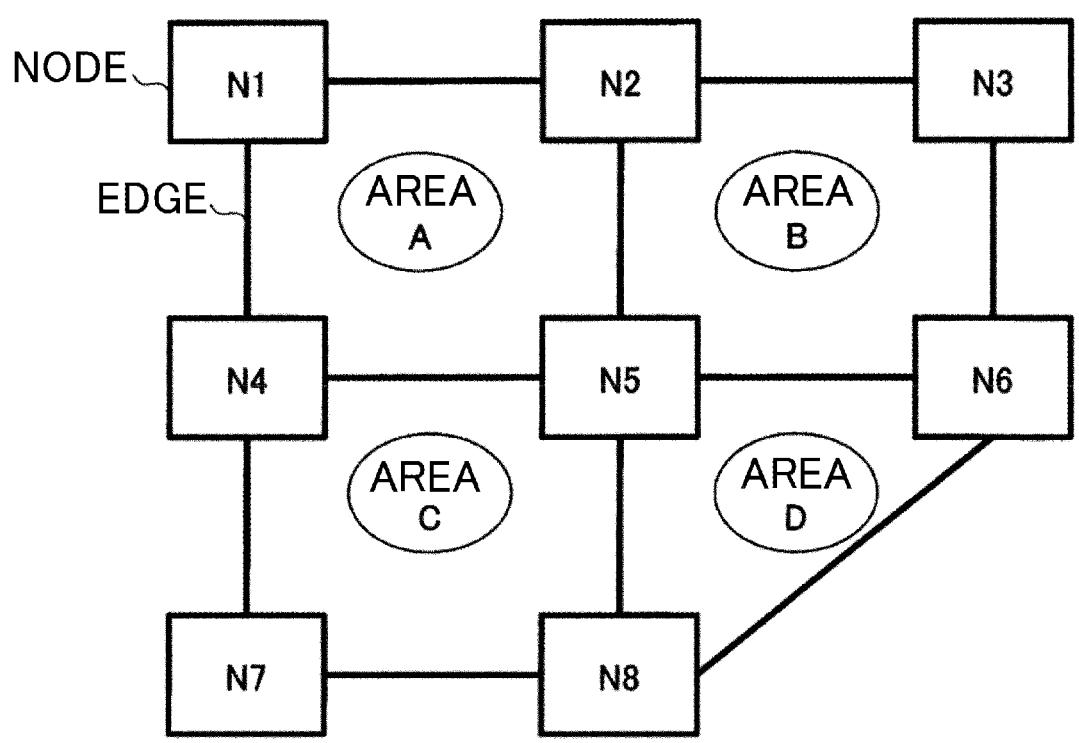
FIG. 8 is a diagram showing an example configuration of an optical transmission network.

An example of the operation of the topology design device 100 will be described below. FIG. 8 shows an overall configuration image of the optical transmission network 200 in this example. In this example, a bypass route is added for the state where the optical transmission network 200 shown in FIG. 8 is designed as an existing topology.

In this example, a region surrounded by nodes and edges is called an "area". The nodes and edges are elements that constitute the "area".

As shown in FIG. 8, in this example, there are areas at four locations, namely an area surrounded by "N1, N2, N4, and N5" and edges that connect these nodes, an area surrounded by "N2, N3, N5, and N6" and edges that connect these nodes, an area surrounded by "N4, N5, N7, and N8" and edges that connect these nodes, and an area surrounded by "N5, N6, and N8" and edges that connect these nodes. These areas are denoted as A, B, C, and D, respectively, for convenience of description.

Information indicating the topology (information regarding nodes and information regarding edges) and the areas shown in FIG. 8 is stored in the topology management DB 122 in this example.

It is assumed that demand information shown in FIG. 9 is stored in the demand management DB 121 in this example. In the example in FIG. 9, paths for each demand (transit nodes) are also indicated.

For example, a demand of item No. 1 represents traffic flowing from the start point N8 to the end point N4 in a path N8→N7-N4. Note that items that can be stored are not limited to the start point, the endpoint, and the path. Information stored in the demand management DB 121 may be past history information, or may be demand information predicted based on the past history information. In this example, the magnitude (traffic volume) of the demand of each item number is 1, for convenience.

<Operation of Topology Design Device 100 in Example>

The operation of the topology design device 100 in this example will be described below in accordance with the procedure of the flowcharts shown in FIGS. 4 to 7.

Figure 4:
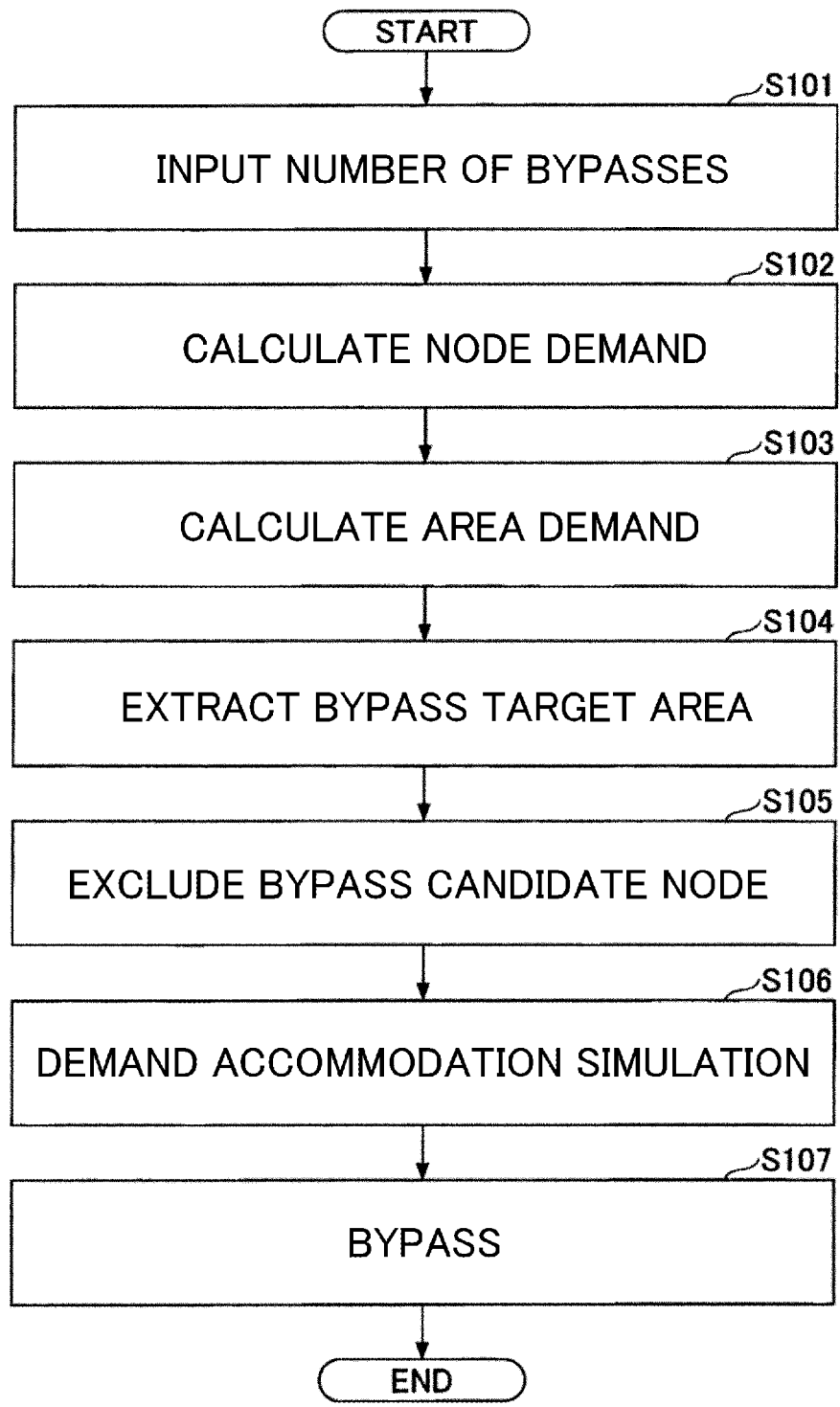
FIG. 4 is a flowchart showing entire processing of the topology design device.

<S101 in FIG. 4: Input of Number of Bypasses>

The number of bypasses is input to the topology design device 100 through the input unit 131. The number of bypasses input is used as a condition for ending the processing. As mentioned above, designation of the number of bypasses is not essential. Processing such as repeating bypassing until no bypass candidate can be determined any more may be performed without designating the number of bypasses.

<S102: Node Demand Calculation>

The node demand calculation unit 111 calculates node demands for each node, based on information in the demand management DB 121 (FIG. 9). The node demands for a node refer to the total value of demands for which each node serves as a start point or an end point for the demand. In the case of the demands shown in the demand management DB 121 (FIG. 9) in this example, the node demands for each node is: N1=4, N2=2, N3=0, N4=1, N5=2, N6=4, N7=3, and N8=4.

For example, for the node N1, there is one demand for each of item Nos. 4, 5, 6, and 7 in the demand management DB 121 (FIG. 9), and therefore there are four demands in total. The node demands can also be calculated similarly for the other nodes.

<S103: Area Demand Calculation>

The area demand calculation unit 112 calculates area demands of each area, based on information in the topology management DB 122 (FIG. 8) and area demand information in the demand management DB (FIG. 9). The area demands of an area refer to the total value of demands that pass through edges constituting this area. In the case of this example, A=5, B=5, C=6, and D=6.

For example, regarding the area A, demands of item Nos. 4, 5, 6, 7, and 9 in the demand management DB 121 (FIG. 9) each pass through at least one edge constituting the area A, and therefore there are five demands in total. The area demands can also be calculated similarly for the other areas.

Figure 5:
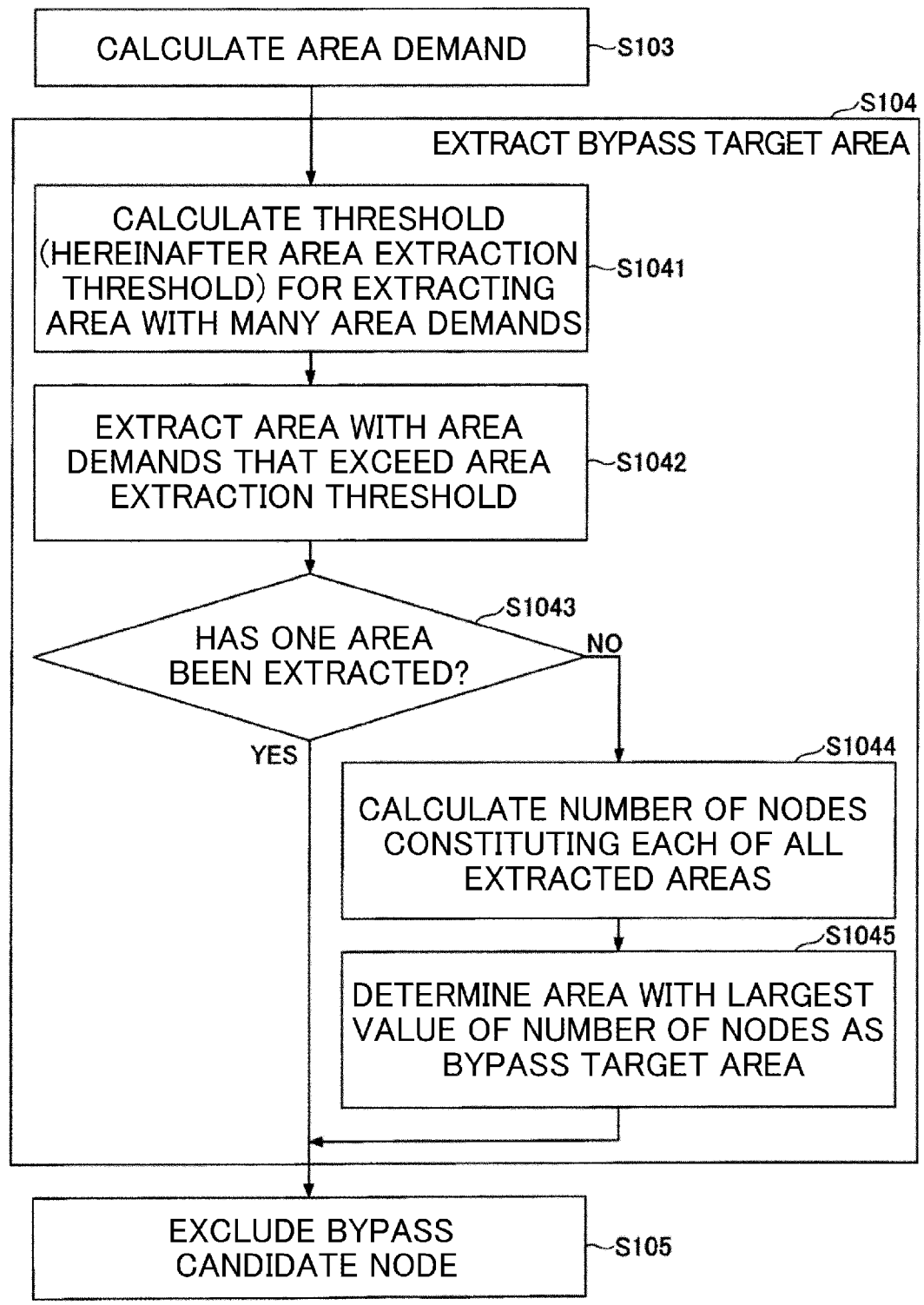
FIG. 5 is a flowchart showing processing for extracting bypass target area.

<S1041 in FIG. 5: Area Extraction Threshold Calculation>

The bypass target area extraction unit 113 calculates the area extraction threshold to be used to extract an area that can be a bypass target area. Calculation methods will be described later. In this example, a method a (the average value of area demands), of the later-described calculation methods, is used. Accordingly, the area extraction threshold in this example is: (5+5+6+6)/4=5.5. Examples of the methods for calculating the area extraction threshold will be described below.

(Method a)

In the method a, the bypass target area extraction unit 113 calculates the average value of n area demands $DA_n$ as the area extraction threshold $DA_{th}$, using the following equation.

$$DA_{th} = \frac{\sum_i^n DA_i}{n} \qquad [\text{Math. 1}]$$

(Method b)

In the method b, the bypass target area extraction unit 113 numerically calculates the area extraction threshold $DA_{th}$ based on an empirical distribution function F(DA) of n area demands $DA_n$ represented by the following equation, or obtains an approximate function for an empirical distribution function F(t) and calculates the area extraction threshold $DA_{th}$ as an inverse function of the empirical distribution function F(t).

$$F(DA) = \frac{\#(1 \leq i \leq n | DA_i \leq DA)}{n} \qquad [\text{Math. 2}]$$

At this time, the probability F(t) at which the area extraction threshold $DA_{th}$ is the threshold DA is determined in any manner by a user who uses and operates this function.

(Method c)

In the method c, the bypass target area extraction unit 113 assumes that n area demands $DA_n$ follow a certain probability distribution, and numerically calculates the area extraction threshold $DA_{th}$ based on a cumulative distribution function F(t) of the probability distribution. As an example, the probability distribution function F(t) in the case of following a normal distribution is shown below.

$$F(t) = \left(1 + \text{erf} \frac{DA - \mu}{\sqrt{2\sigma^2}}\right) \qquad [\text{Math. 3}]$$

Similarly to the method b, the probability F(t) at which the area extraction threshold $DA_{th}$ is the threshold DA is determined in any manner by a user who uses and operates this function.

In the above equation, y denotes the average value of the area demands $DA_n$ to be used to estimate the area extraction threshold $DA_{th}$. σ denotes a standard deviation of the area demands $DA_n$ to be used to estimate the area extraction threshold $DA_{th}$.

<S1042: Area Extraction>

The bypass target area extraction unit 113 extracts an area with area demands that exceed the area extraction threshold. In this example, areas C and D are extracted as areas with area demands that exceed the area extraction threshold 5.5. Note that the area extraction method is not limited thereto, and a user who uses and operates this function may extract an area in any manner.

<S1043, S1044: Calculation of Number of Nodes>

In this example, since a plurality of areas that are candidates for the bypass target have been extracted, the processing proceeds to S1044 in the flow in FIG. 5, and the bypass target area extraction unit 113 calculates the number of nodes constituting each area. In this example, the number of nodes in the area C is four, and the number of nodes in the area D is three, as shown in FIG. 8.

<S1045>

The bypass target area extraction unit 113 determines either the area C or D that has more nodes as the bypass target area. In this example, the area C is determined as the bypass target area.

Figure 6:
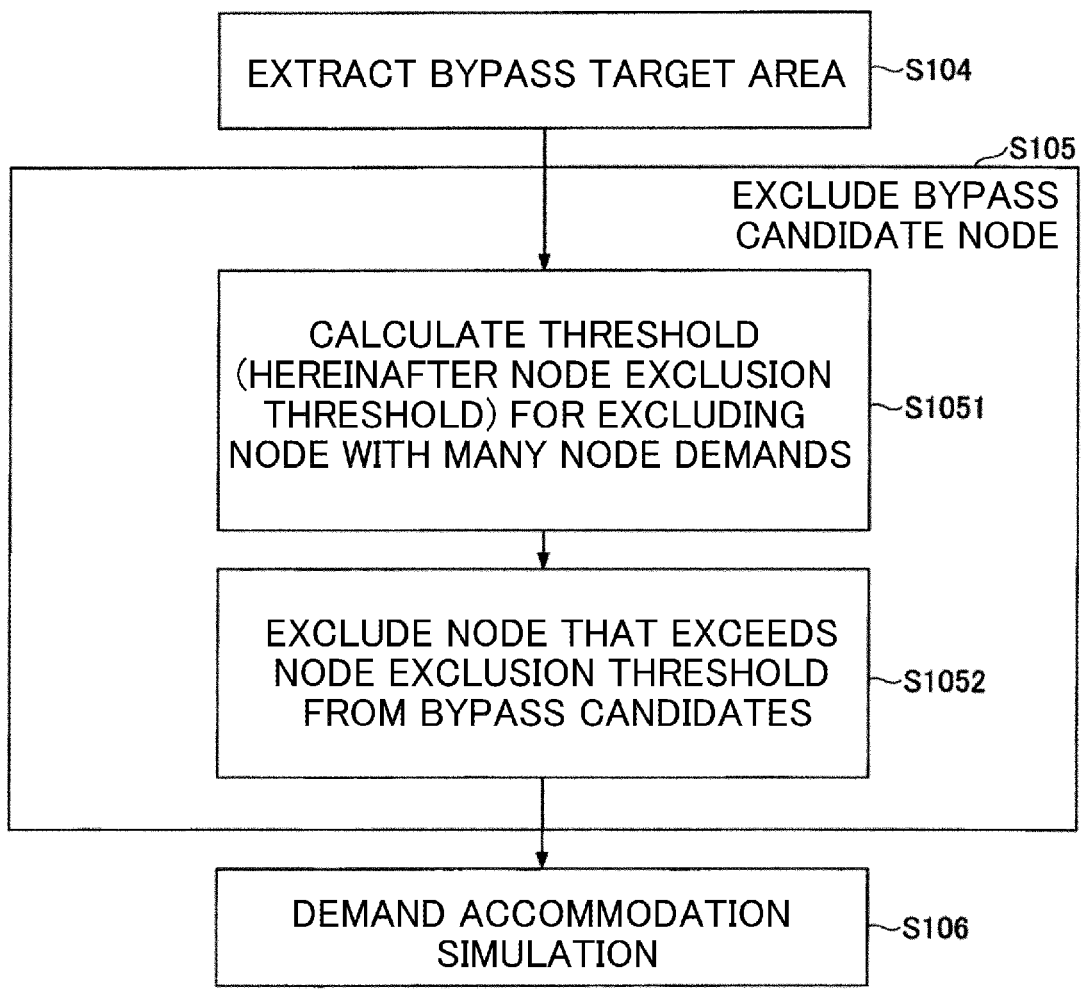
FIG. 6 is a flowchart showing processing for excluding a bypass candidate node.

<S1051, S1052 in FIG. 6>

The bypass candidate node exclusion unit 114 calculates the node exclusion threshold for determining a node to be excluded from bypass candidates (candidates for a node to serve as an endpoint node of a bypass route) from the plurality of nodes constituting the bypass target area C. A method for calculating the node exclusion threshold will be described later.

The bypass candidate node exclusion unit 114 excludes a node with demands that exceed the node exclusion threshold, out of the nodes (N4, N5, N8, and N7) constituting the bypass candidate area C, from the bypass candidates. However, not limited thereto, a node may be designated in any manner by a user who uses and operates this function, or the node exclusion threshold may be determined in any manner by a user who uses and operates this function, or only a node with the largest number of demands may be excluded.

In this example, only a node with the largest number of node demands (=N8) is excluded. Examples of the methods for calculating the node exclusion threshold will be described below.

(Method a)

In the method a, the bypass candidate node exclusion unit 114 uses the average value of n node demands $DN_n$ as the node exclusion threshold $DN_{th}$, using the following equation.

$$DN_{th} = \frac{\sum_{i}^{n} DN_i}{n} \qquad \text{[Math. 4]}$$

(Method b)

In the method b, the bypass candidate node exclusion unit 114 numerically calculates the node exclusion threshold $DN_{th}$ based on an empirical distribution function F(DN) of n node demands $DN_n$ represented by the following equation, or obtains an approximate function for an empirical distribution function F(t) and calculates the node exclusion threshold $DN_{th}$ as an inverse function of the empirical distribution function F(t).

$$F(DN) = \frac{\#(1 \le i \le n | DN_i \le DN)}{n} \qquad \text{[Math. 5]}$$

At this time, the probability F(t) at which the node exclusion threshold $DN_{th}$ is the threshold DN is determined in any manner by a user who uses and operates this function.

(Method c)

In the method c, the bypass candidate node exclusion unit 114 assumes that n node demands $DN_n$ follow a certain probability distribution, and numerically calculates the node exclusion threshold $DN_{th}$ based on a cumulative distribution function F(t) of the probability distribution. As an example, the probability distribution function F(t) in the case of following a normal distribution is shown below.

$$F(t) = \left(1 + \text{erf} \frac{DN - \mu}{\sqrt{2\sigma^2}}\right) \qquad \text{[Math. 6]}$$

Similarly to the method b, the probability F(t) at which the node exclusion threshold $DN_{th}$ is the threshold DN is determined in any manner by a user who uses and operates this function.

In the above equation, μ is the average value of the node demands $DN_n$ to be used to estimate the node exclusion threshold $DN_{th}$. σ denotes a standard deviation of the node demands $DN_n$ to be used to estimate the node exclusion threshold $DN_{th}$.

Figure 7:
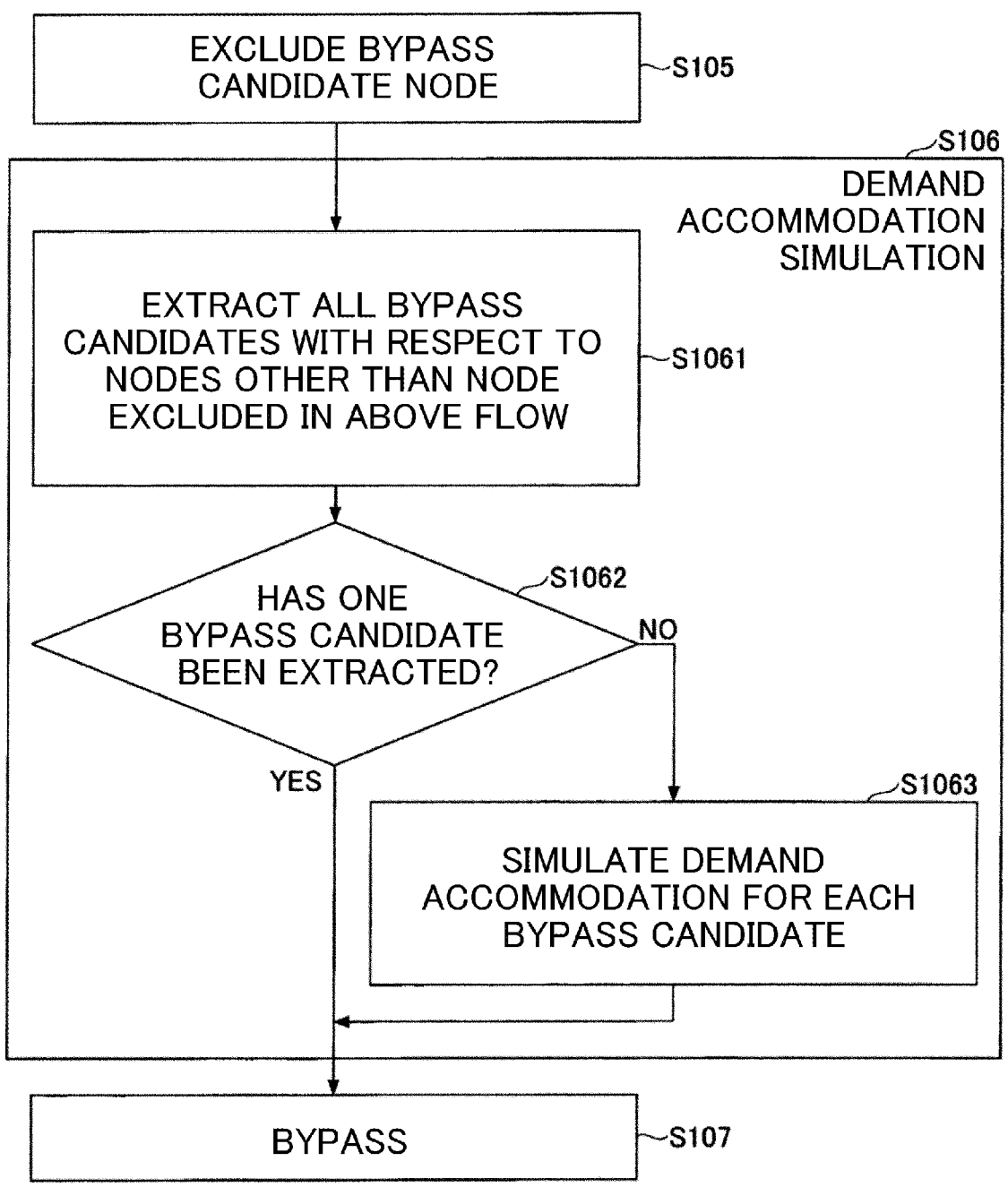
FIG. 7 is a flowchart showing processing for simulating demand accommodation.

<S1061 In FIG. 7: Bypass Candidate Extraction, S1063: Simulation>

The demand accommodation simulation unit 115 extracts all the bypass candidates in the bypass target area with respect to the nodes other than the node excluded in S1052. In this example, N8 has been excluded from the area C, which is the bypass target area, and therefore one bypass candidate that connects N5 and N7 is extracted.

In this example, since there is one bypass candidate, in S107, the bypass unit 116 adds an edge (bypass) that connects N5 and N7, and stores, in the topology management DB 122, the configuration (the topology and area information regarding the entire optical transmission network) to which the bypass has been added. In this example, an edge that connects N5 and N7 is added to the optical transmission network (the topology and area information) shown in FIG. 8, and information indicating that an area of "N4, N5, and N7" and an area of "N5, N7, and N8" have been formed is stored in the topology management DB 122.

If there are a plurality of bypass candidates, demand accommodation at each bypass candidate is simulated based on information in the demand management DB 121, and a bypass location is determined based on the simulation results. Demand accommodation may also be simulated when there is one bypass candidate.

The demand accommodation simulation here refers to searching for a route (determining a transit node) for each demand stored in the demand management DB 121 in accordance with a designated node, allocating wavelengths, and accommodating the demand. Any evaluation index with which accommodation efficiency can be evaluated, such as the maximum wavelength number used, or the total value or the average value of the number of paths to the nodes that constitute the network, may be used to compare the simulation results.

<Repetitive Processing>

The topology design device 100 repeats S102 to S107 in the flow in FIG. 4 until the designated end condition is satisfied. In this example, since the number of bypasses is designated, the end condition is "carrying out bypassing for the designated number" or "not being able to carry out bypassing any more".

Effects of Embodiment

As described above, in the present embodiment, a plurality of small areas are defined while assuming that the entire optical transmission network is constituted by a combination of small areas, and bypass candidates are narrowed down based on area demands and node demands. Such narrowing down makes it possible to suppress an explosive increase in computational complexity due to an increase in the number of nodes constituting the optical transmission network.

Further, since an area with a large number of area demands is determined as a bypass target area, demands can be distributed and prevented from being concentrated on edges of a specific area. In addition, a node with a large number of node demands in the bypass target area is excluded from the bypass candidates, making it possible to cause traffic to flow while bypassing this node. That is to say, demands can be accommodated in a distributed manner. As a result, accommodation efficiency of the optical transmission network improves, and the construction cost thereof can be suppressed.

Summary of Embodiment

The present specification at least describes a topology design device, a topology design method, and a program that are described in the following items.

(Item 1)

A topology design device for designing a topology in an optical transmission network, the device including:

a bypass target area determination unit for determining a bypass target area, which is an area to which a bypass route is to be added in the optical transmission network, the area indicating a region surrounded by nodes and edges, based on an area demand, namely a total value of a demand for communication to be performed via an edge, by referencing a topology management database that stores information regarding nodes, edges, and areas in the optical transmission network, and a demand management database that stores demands in the optical transmission network; and a bypass determination unit for excluding a node from a plurality of nodes constituting the bypass target area and determining a bypass route from the plurality of nodes from which the node has been excluded, based on a node demand, namely a total value of a demand for which each node serves as a start point or an end point of the demand, by referencing the topology management database and the demand management database.

(Item 2)

The topology design device according to item 1, wherein the bypass target area determination unit determines, as the bypass target area, an area having area demands exceeding an area extraction threshold.

(Item 3)

The topology design device according to item 2, wherein if there are a plurality of areas having area demands exceeding the area extraction threshold, the bypass target area determination unit determines, as the bypass target area, an area with a largest number of nodes out of the plurality of areas.)

(Item 4)

The topology design device according to any one of items 1 to 3, wherein the bypass determination unit excludes a node having node demands exceeding a node exclusion threshold from the plurality of nodes constituting the bypass target area.

(Item 5)

The topology design device according to any one of items 1 to 4, wherein the bypass determination unit determines a bypass route by carrying out demand accommodation simulation for each bypass route that can be formed from the plurality of nodes from which the node has been excluded.

(Item 6)

A topology design method to be executed by a topology design device for designing a topology in an optical transmission network, the method including:

a bypass target area determination step of determining a bypass target area, which is an area to which a bypass route is to be added in the optical transmission network, the area indicating a region surrounded by nodes and edges, based on an area demand, namely a total value of a demand for communication to be performed via an edge, by referencing a topology management database that stores information regarding nodes, edges, and areas in the optical transmission network, and a demand management database that stores demands in the optical transmission network; and a bypass determination step of excluding a node from a plurality of nodes constituting the bypass target area and determining a bypass route from the plurality of nodes from which the node has been excluded, based on a node demand, namely a total value of a demand for which a node serves as a start point or an end point of the demand, by referencing the topology management database and the demand management database.

(Item 7)

A program for causing a computer to function as each unit of the topology design device according to any one of items 1 to 5.

Although the present embodiment has been described above, the present invention is not limited to such a specific embodiment, and various variations and modifications can be made within the scope of the gist of the present invention described in the claims.

REFERENCE SIGNS LIST

100 Topology design device
110 Bypass function unit
111 Node demand calculation unit
112 Area demand calculation unit
113 Bypass target area extraction unit
114 Bypass candidate node exclusion unit
115 Demand accommodation simulation unit
116 Bypass unit
120 Storage unit
121 Demand management DB
122 Topology management DB
130 Input-output function unit
131 Input unit
132 Output unit
200 Optical transmission network
1000 Drive device
1001 Recording medium
1002 Auxiliary storage device
1003 Memory device
1004 CPU
1005 Interface device
1006 Display device
1007 Input device

The invention claimed is:

1. A topology design device for designing a topology in an optical transmission network, the device comprising:

a memory; and a processor configured to execute determining a bypass target area, which is an area to which a bypass route is to be added in the optical transmission network, the area indicating a region surrounded by nodes and edges, based on an area demand, namely a total value of a demand for communication to be performed via an edge, by referencing a topology management database that stores information regarding nodes, edges, and areas in the optical transmission network, and a demand management database that stores demands in the optical transmission network; and excluding a node from a plurality of nodes constituting the bypass target area and determining the bypass route from the plurality of nodes from which the node has been excluded, based on a node demand, namely a total value of a demand for which each node serves as a start point or an end point of the demand, by referencing the topology management database and the demand management database, wherein determining the bypass route comprises
calculating an accommodation efficiency for each of at least two candidate bypass routes; and
selecting a candidate bypass route with the highest accommodation efficiency from the at least two candidate bypass routes to be the bypass route.

2. The topology design device according to claim 1,
wherein the determining determines, as the bypass target area, an area having area demands exceeding an area extraction threshold.

3. The topology design device according to claim 2,
wherein if there are a plurality of areas having area demands exceeding the area extraction threshold, the determining determines, as the bypass target area, an area with a largest number of nodes out of the plurality of areas.

4. The topology design device according to claim 1,
wherein the excluding excludes a node having node demands exceeding a node exclusion threshold from the plurality of nodes constituting the bypass target area.

5. The topology design device according to claim 1,
wherein the excluding determines a bypass route by carrying out demand accommodation simulation for each bypass route that can be formed from the plurality of nodes from which the node has been excluded.

6. A topology design method to be executed by a topology design device that includes a memory and a processor for designing a topology in an optical transmission network, the method comprising:

determining a bypass target area, which is an area to which a bypass route is to be added in the optical transmission network, the area indicating a region surrounded by nodes and edges, based on an area demand, namely a total value of a demand for communication to be performed via an edge, by referencing a topology management database that stores information regarding nodes, edges, and areas in the optical transmission network, and a demand management database that stores demands in the optical transmission network; and excluding a node from a plurality of nodes constituting the bypass target area and determining the bypass route from the plurality of nodes from which the node has been excluded, based on a node demand, namely a total value of a demand for which a node serves as a start point or an end point of the demand, by referencing the topology management database and the demand management database, wherein determining the bypass route comprises
calculating an accommodation efficiency for each of at least two candidate bypass routes; and
selecting a candidate bypass route with the highest accommodation efficiency from the at least two candidate bypass routes to be the bypass route.

7. A non-transitory computer-readable recording medium having computer-readable instructions stored thereon, which when executed, cause a computer including a memory and a processor to operate as the topology design device according to claim 1.

* * * * *